Inventor
Oscar W. Johnson
By
McCanna and Morsbach
Attys

Sept. 23, 1952     O. W. JOHNSON     2,611,392
PILOT CONTROLLED MULTIPORT VALVE
Filed Aug. 23, 1944     5 Sheets-Sheet 2
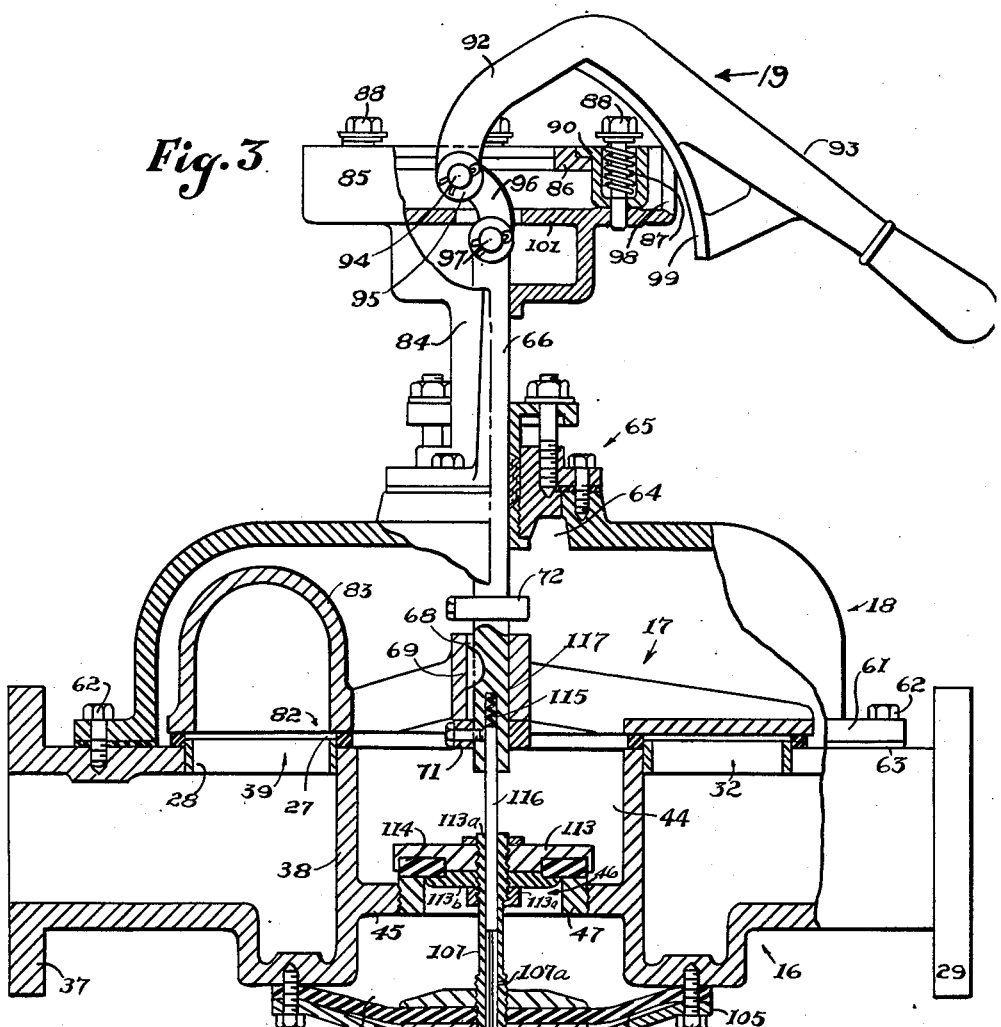
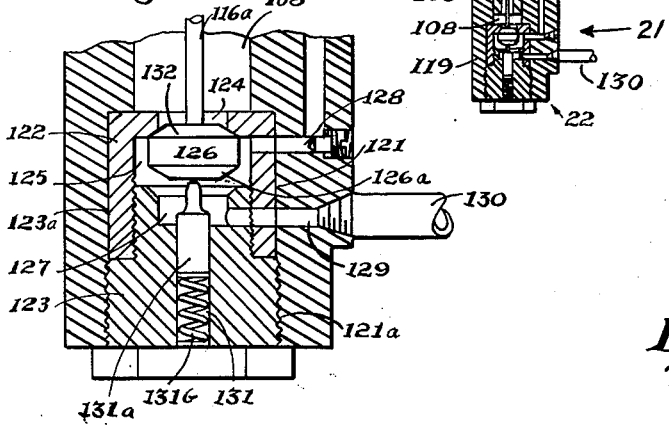
Inventor
Oscar W. Johnson
By McCanna and Morsbach
Attys

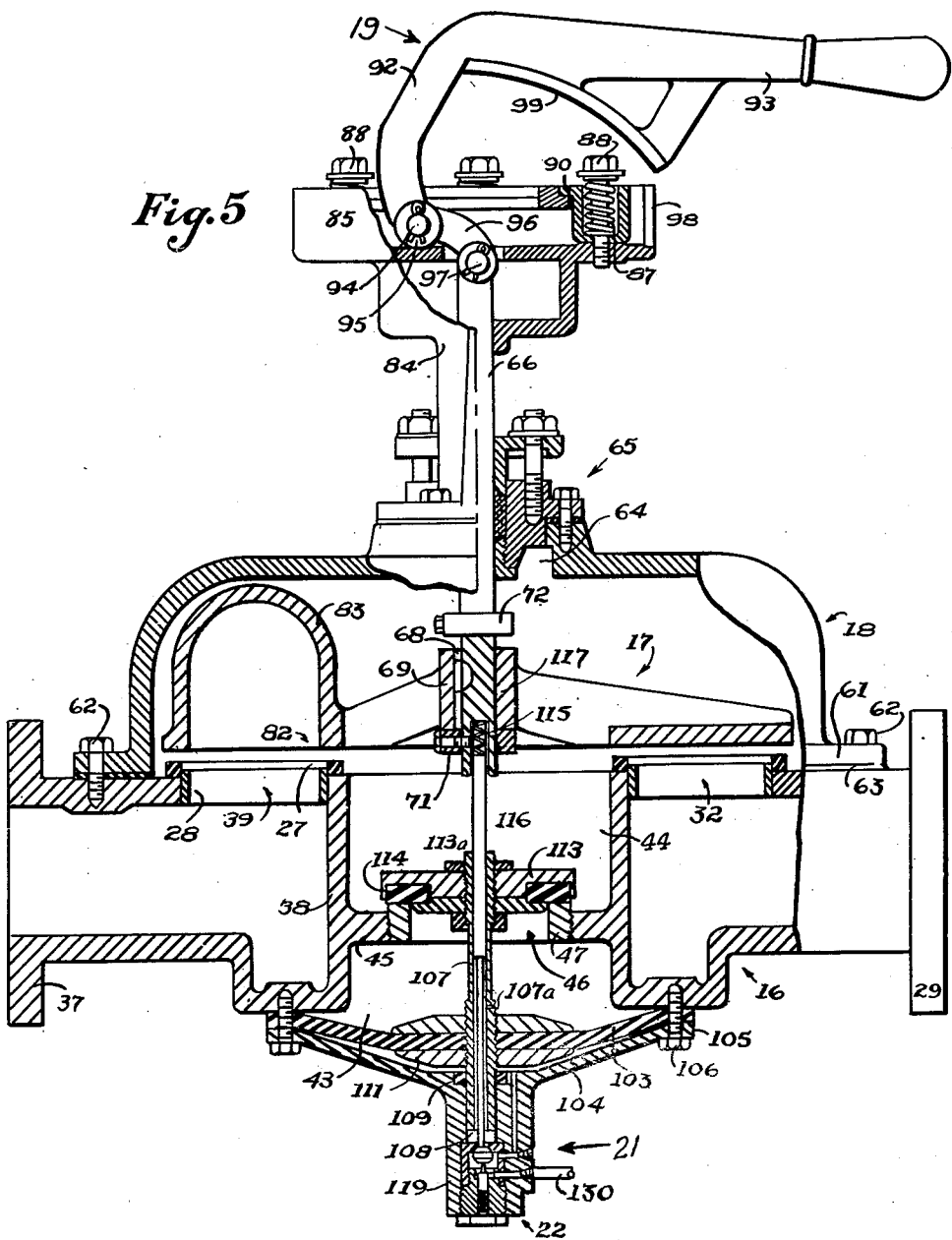

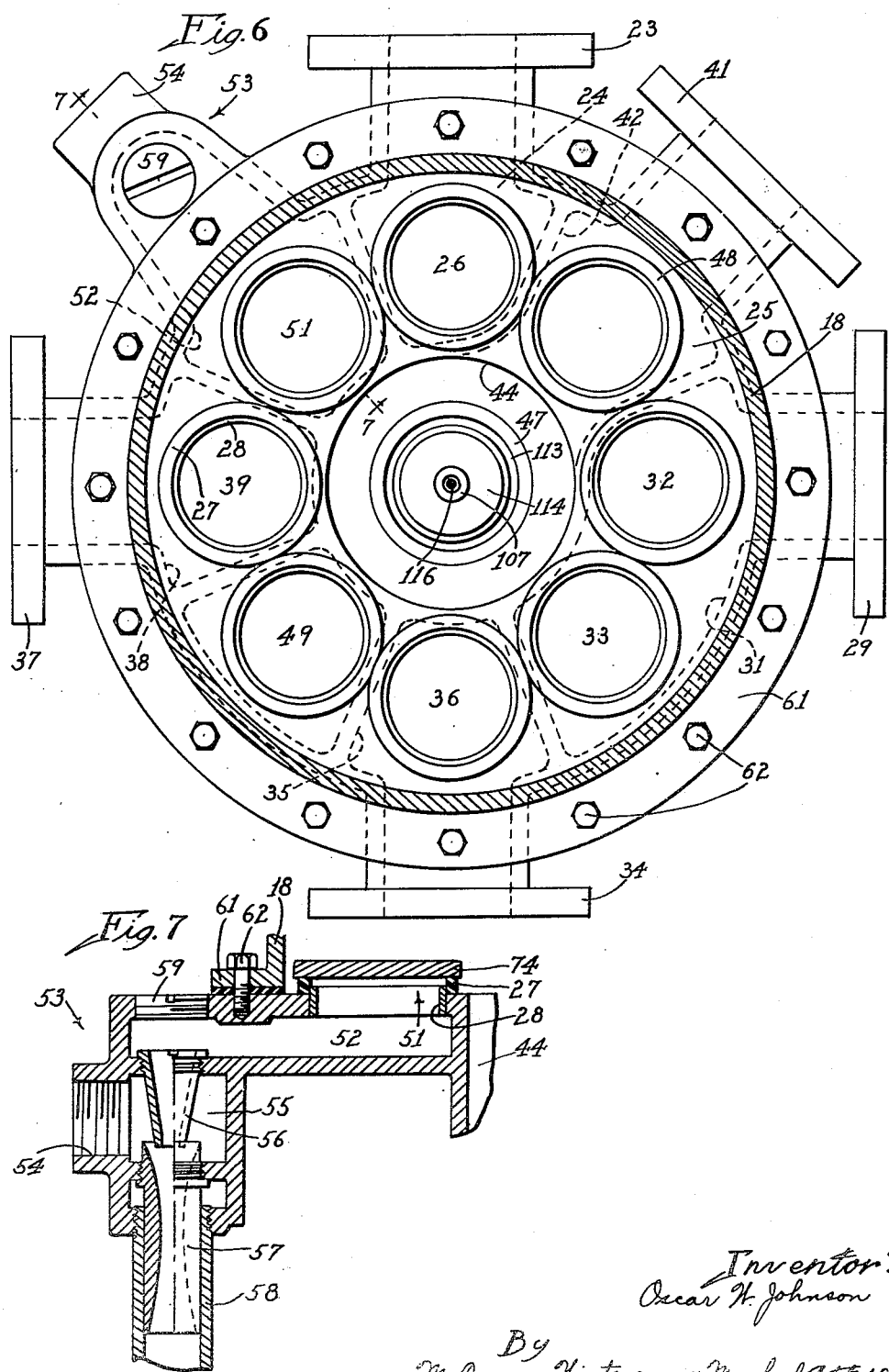

Sept. 23, 1952 — O. W. JOHNSON — 2,611,392
PILOT CONTROLLED MULTIPORT VALVE
Filed Aug. 23, 1944 — 5 Sheets-Sheet 5
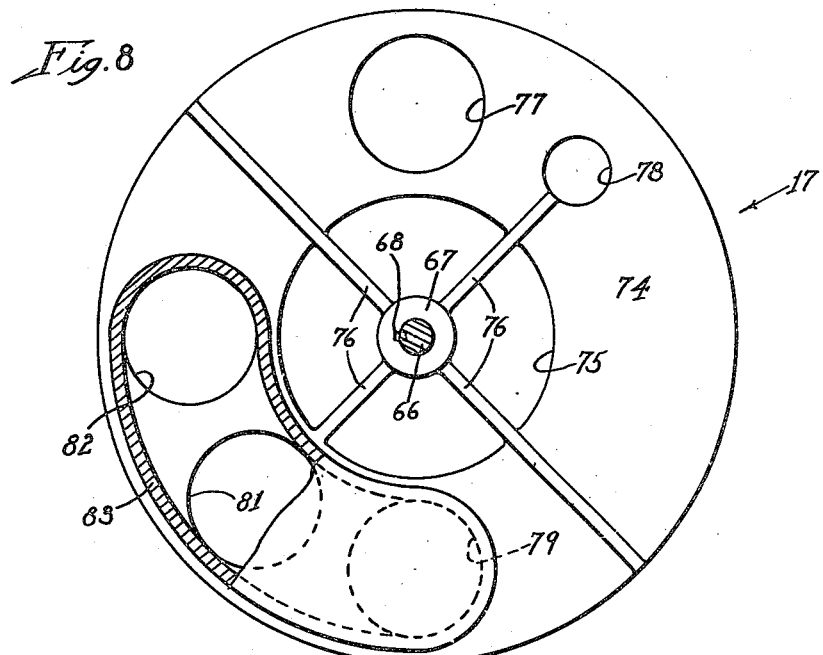
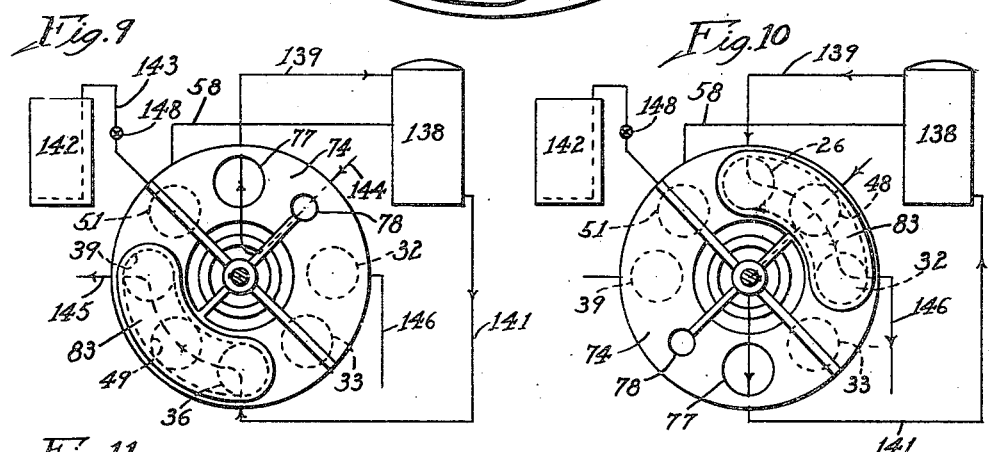
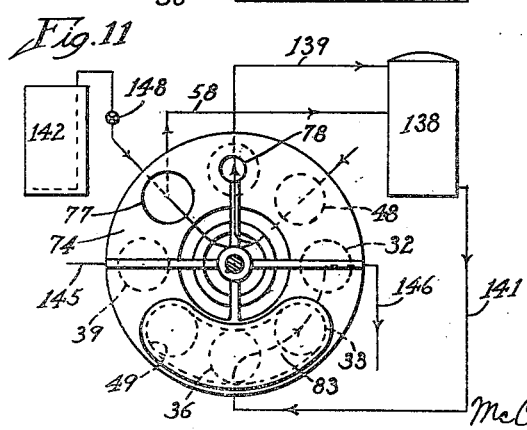
Inventor:
Oscar W. Johnson
By McCanna, Wintercorn & Morsbach Attys.

Patented Sept. 23, 1952

2,611,392

UNITED STATES PATENT OFFICE 2,611,392

PILOT CONTROLLED MULTIPORT VALVE

Oscar W. Johnson, Rockford, Ill., assignor to Automatic Pump & Softener Corporation, Rockford, Ill., a corporation of Illinois Application August 23, 1944, Serial No. 550,720

12 Claims. (Cl. 137—633)

This invention relates to valves and more particularly to valves of the multi-port lift-turn type wherein a movable member is lifted away from a stationary member and rotated for the purpose of changing the port combinations and changing the flow through the valve.

While valves of the type herein contemplated are of more or less general utility, they prove to be of exceptional merit in the control of the flow of liquids through water treatment devices, such as the common base-exchange water softeners, filters, and analogous water treatment devices, and valves of this type have very largely replaced other so-called single control valves for this purpose, particularly in softeners of small size. However, when this type of valve is used on water treatment apparatus of large capacity, such, for example, as those in which the pipe sizes are 3" or greater, a number of difficulties arise. Among these difficulties is the fact that with the large valves it becomes extremely difficult and sometimes impossible to lift the rotor free of the stator to effect the turning of the valve. Even with moderate sized valves where the rotor can be lifted with difficulty, the lifting of the valve creates a decidedly objectionable water-hammer, and it is impossible to hold the valve against excessively rapid seating when the valve is reseated, this reseating producing a second water-hammer which may be sufficiently great to cause damage to the equipment. Therefore, when these valves in large sizes have been installed in industrial equipment, it has been necessary to install a separate hand valve in the inlet water line ahead of the multiple port valve so that the water pressure may be cut off from the valve prior to its being shifted. This is objectionable in that it increases the cost of the installation and also increases the complexity of the system resuiring, as it does, a separate manual operation of a separate valve, and in a measure losing the primary advantage of a multi-port valve.

Another objection to valves of this type has been the fact that with large industrial installations it has been necessary to have a flow arrangement which has heretofore been impossible to provide in a valve of this character. Thus in large zeolite water softeners employing greensand is relatively low, only a small amount of brine is necessary to effectuate regeneration of the mineral. On the other hand, it is necessary to provide a relatively large head room in the softener which at the time of regeneration is filled with water. If brine is introduced into the head of the softener, it becomes mixed with this large volume of water, and consequently when reaching the mineral is very dilute. In order to avoid wasting salt by introducing enough salt to bring the concentration to the required level, the brine is introduced below the top end of the softener and just above the mineral bed. While this is a partial solution of the problem, I have found it also to be desirable to at the same time introduce a second flow of small magnitude directly at the head of the tank and to thereby prevent the brine from swirling upward to mix with the water in the head of the tank to be later delivered downward at an inopportune time. In order to do this by means of a single control valve, it is necessary to have a flow of water to the top of the softener at the same time that brine is flowing to an intermediate point.

An important object of the invention is the provision of a valve of the character described wherein means are provided for relieving the pressure within the valve at a relatively slow rate at the inception of the valve operation and for gradually re-applying the pressure after the valve is brought to its seated position, and wherein the pressure is relieved and replaced without a separate manual operation and in response to operation of the conventional valve operating mechanism.

Another important object of the invention is the provision of a multiple port valve for the control of water treatment apparatus having a port arrangement adapted to effect the essential flows, and to discontinue flow to the service line during all steps of the regeneration, and in addition, to provide, in the brine introduction step, a flow of brine to an intermediate point on a tank and a flow of water to the head of the tank.

Other objects and advantages will appear from the accompanying drawings and the following description, in which—

Fig. 3 is a view similar to Figure 1 showing a moved position with the pressure control mechanism in a position to relieve the pressure in the valve;

Fig. 4 is a section similar to Fig. 2 showing the position of the pilot corresponding to Fig. 3;

Fig. 5 is a view similar to Figure 1 showing the valve in the completely lifted position;

Fig. 6 is a view taken on the line 6—6 of Figure 1 showing a face view of the stator;

Fig. 7 is a view of the rotor showing the port connections thereon taken on the line 7—7 of Fig. 6;

Fig. 8 is a top view of the rotor with a part of the transfer passage broken away, and Figs. 9, 10 and 11 are diagrammatic views showing the valve connected to a conventional base-exchange water treatment device, and the valve positions in the three steps required for the regeneration thereof.

Figure 1:
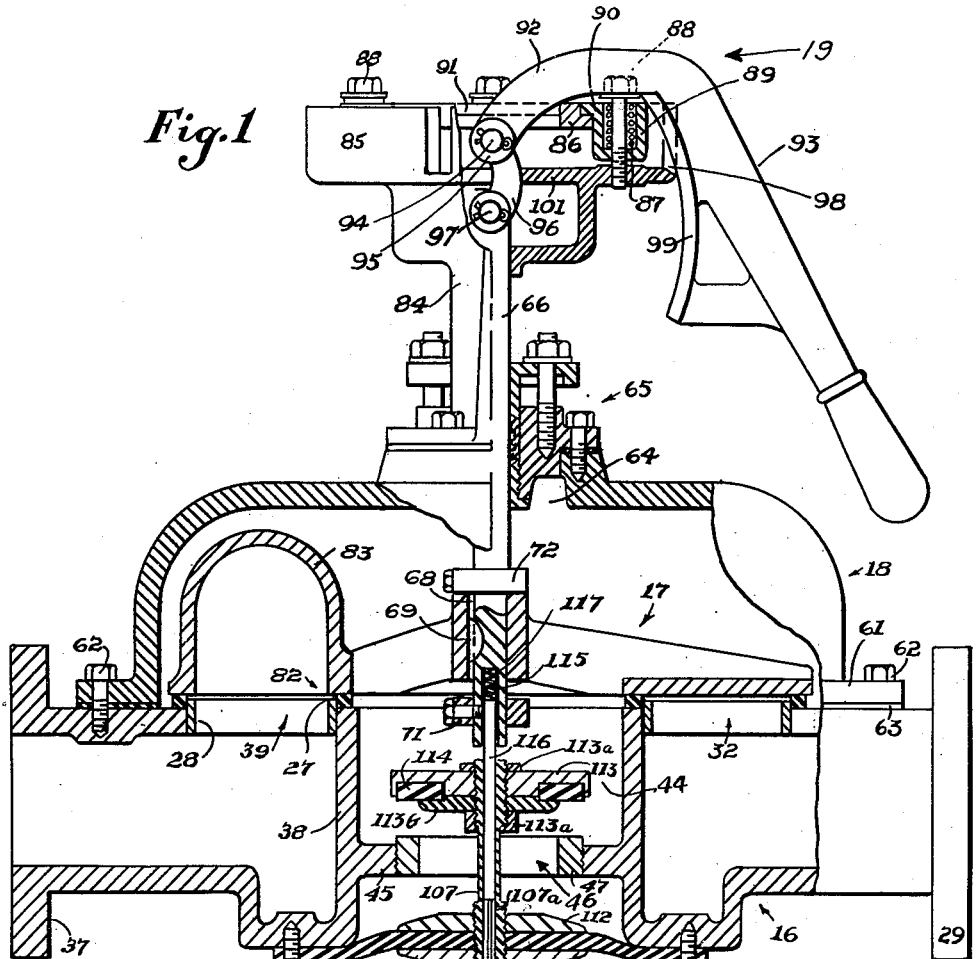
Figure 1 is a side elevation partly in section showing a valve embodying the invention with the parts in the normal seated position arranged for conventional flow through the valve.

This is a continuation in part of my abandoned copending application, Serial No. 495,822, filed July 23, 1943, entitled "Multiple Port Valve."

The embodiment of the invention herein shown includes a back plate, body member or stator designated generally by the numeral 16, a face plate, stem plate or rotor 17, a bonnet or cover 18, a valve operating mechanism 19, an hydraulically operated valve 21, and a pilot valve 22.

The stator or body member is in this instance of somewhat cylindrical cross-section and is ordinarily formed of cast metal. Arranged about the periphery thereof are pipe connections, a pipe connection 23 normally being connected to the top of a softener or other water treatment device and communicating with a chamber 24 within the stator. The stator has a face plate 25 provided with a port 26 opening into the chamber 24. This port as well as the other ports of the stator presently to be described is provided with a gasket in the form of a ring 27 of rubber or other suitable gasket material seated at one edge against the face 25 and retained in position by a rigid ferrule 28 disposed in the port opening (note Figure 1). At 90° with respect to the pipe connection 23 is a pipe connection 29 normally connected to drain when the valve is used in connection with water treatment apparatus. This pipe connection communicates with a chamber 31 in the stator having ports 32 and 33 in the face. At 180° with respect to the pipe connection 23 is a pipe connection 34 normally connected to the bottom of the water treatment tank and communicating with a chamber 35 in the stator having a port 36 in the face. At 270° with respect to the pipe connection 23 is a further pipe connection 37 normally connected to the service line of a water treatment apparatus and communicating with a chamber 38 within the stator, the face having a port 39. Intermediate the pipe connections 23 and 29 is a pipe connection 41 normally connected to a source of water supply and communicating through a channel 42 in the stator with a chamber 43 disposed in the center of the stator. In this instance the face of the stator has a depressed chamber as indicated at 44 at its center divided from the chamber 43 by a transverse wall 45 having a pressure port 46 axially disposed therein, the port having a seat 47 surrounding the same for a purpose presently to be described.

Disposed on the face 24 of the stator intermediate the ports 26 and 32 is a gasket 48 of the same size and diameter as the port gaskets forming in effect a blank port, the center of this gasket being disposed at an angle of substantially 45° from the center with respect to the ports 26 and 32. A similar blank port is indicated at 49. The purpose of these blank ports is to provide a seat against the rotor in each position thereof so as to prevent solid material from being lodged thereon, and also to prevent flow through the ports of the rotor which may occupy these positions.

Disposed between the ports 39 and 26 is a port 51 passing through the face 25 of the stator and into a chamber 52 disposed in the stator and in an outwardly disposed ear 53 thereof as best shown in Fig. 7. The ear 53 also has a pipe opening 54 radially disposed thereon and normally communicating with the source of regenerating fluid. Disposed between the chamber 52 and the chamber 55 with which the pipe connection 54 communicates, is an injector nozzle 56 which discharges into an injector tube 57, the latter of which in turn discharges into a pipe 58 delivering brine or other regenerating fluid to the water treatment tank. A plug 59 closes an opening into the chamber 52 through which access may be had to the injector. It will be seen that the ports 26, 32, 33, 36, 39, 51, and the blank ports 48 and 49 are arranged concentrically around the center line of the stator at 45° angles.

Positioned against the face 25 of the stator so as to enclose the annular ports is the bonnet or cover 18, the bonnet having an outwardly disposed annular flange 61 attached to the face by means of annularly spaced bolts 62, a gasket 63 being disposed between the flange and the face. The bonnet has a central opening 64 within which is disposed a stuffing box 65 of conventional design through which a stem 66 passes to the interior of the bonnet. The rotor 17 is disposed within the bonnet and mounted on the stem 66, the rotor having a central sleeve 67 for the passage of the stem therethrough, the sleeve having a keyway 68 for the reception of a key 69 on the stem. Collars 71 and 72 are disposed on the stem and spaced a distance somewhat greater than the length of the sleeve 67 so that the stem has limited lost motion with respect to the rotor. Thus, in the normally seated position of the valve, the collar 72 abuts against the upper end of the sleeve 67 as shown in Figure 1.

The rotor 17, which is shown in Fig. 8, comprises a plate 74 having a central port or opening 75 above the chamber 44, the plate having integral therewith a plurality of ribs 76 extending inward radially for supporting the sleeve 67. The plate also has a large port 77, a small port 78 disposed on the same radius at an angle of 45° with respect thereto, and large ports 79, 81 and 82 also on the same radius as the port 77 and at angles of 180°, 225° and 270°, respectively, in a clockwise direction from the port 77. The ports 79, 81 and 82 open into an enclosed transfer passage 83 disposed on the top of the plate 74, this transfer passage being closed except through the ports 79, 81 and 82, opening onto the bottom of the plate. It will be seen that each of the ports in the plate are on the same radius and are located at angles of 45° with respect to each other or a multiple of 45° so that in each angular rotative position of the rotor all of the ports thereof will register with a port in the stator.

Carried on the bonnet 18 by means of spaced uprights 84 attached to the stuffing box 65 is the valve operating mechanism 19. This mechanism, similar to that described and claimed in Riche Patent No. 2,047,131, comprises a stationary upstanding cylindrical housing 85 having a disk 86 normally urged downward by means of springs 87 acting between cap screws 88 and the bottom of recessed portions 89 in an annular ring 90 bearing against the periphery of the disk 86, the disk being rotatable with respect to the ring. The disk has a slot 91 through which the end 92 of a handle 93 projects, the end 92 of the handle having a pin 94 extending therethrough, the pin carrying rollers 95 on opposite sides of the handle.

The end 92 has a leg 96 integral therewith, the lower end of the leg being forked for the reception of the upper end of the stem 66, a pin 97 passing through the leg and the stem to pivotally connect these elements. The periphery of the housing 85 is provided with a plurality of slots 98 adapted to receive a guide 99 disposed on the handle 93 to define the various seated positions of the valve. In order to shift the valve, the handle 93 is moved from the position shown in Figure 1 through the position shown in Fig. 3, and into the position shown in Fig. 5. During this operation the compression is removed from the springs 87 and the rollers 95 are brought into contact with a plate 101, causing the projecting end 96 of the arm to fulcrum about the pin 94 and move the stem 66 longitudinally. This longitudinal movement of the stem 66 after a certain amount of lost motion brings the collar 71 into contact with the lower end of the sleeve 69, and continued movement of the stem raises the rotor from its seated position into a position such as shown in Fig. 5 in which the lower surface of the plate is free or substantially free from the gaskets 27. At this point the guide 99 has moved completely out of the slot 98 and rotation of the handle rotates the rotor to the next succeeding position in which the handle is again lowered, moving the guide 99 into the next slot and bringing the rollers 95 up against the bottom of the disk 86 to again compress the springs 87 and apply pressure to the stem 66 and the rotor through the projecting end 96 of the lever.

It will be seen that with the valve structure heretofore described the bonnet 18 is filled with water under the full pressure of the incoming water admitted through the pipe connection 41 and the rotor must be lifted or moved against this pressure. As mentioned above, with large valves the force required to lift the rotor becomes excessive, and according to one phase of the invention there is provided a novel combination in which the line pressure is cut off from the chamber prior to lifting the rotor and is kept off until after the rotor is reseated in its new position. The lost motion between the collars 72 and 71 and the sleeve 67 and also the port 46 function in this combination. A hydraulic valve, in this instance a diaphragm valve, is disposed to operate against the seat 47 to control the flow through the port 46, and includes a diaphragm 103 of resilient material such as rubber or reinforced rubber and a cover 104, the cover having a peripheral flange 105 secured to the bottom of the stator by cap screws 106 with the periphery of the diaphragm disposed therebetween and acting as a gasket. A stem 107 extends centrally through the diaphragm and through the port 46, one end thereof being received and guided in a cylinder 108, a seal 109 being disposed between the stem and the cylinder. The stem is threaded for the reception of disks 111 and 112 disposed on opposite sides of the diaphragm and screwed tightly thereagainst to clamp the diaphragm therebetween. Positioned on the stem 107 above the port is a movable valve member or gasket holder 113 threaded on the stem and secured in position by nuts 113a, the holder having a ring type gasket 114 held in position by a retainer 113b. The gasket holder 113 is driven with the diaphragm between the positions of Figs. 1 and 3 to open and close the port 46. The lower end of the stem 66 has a bore 115 within which is received the upper end of a rod 116, a spring 117 within the bore bearing against the upper end of the rod to normally urge it downward and to permit the rod to move upwardly in the bore against the reactive force of the spring. The rod 116 extends through a bore 118 in the stem 107 and has a lower portion 116a of smaller diameter than the bore, so that liquid may enter the bore through an opening 107a and pass through this bore around the rod and into the lower end of the cylinder 108 to supply fluid to the pilot and to the back of the diaphragm 103.

Figure 2:
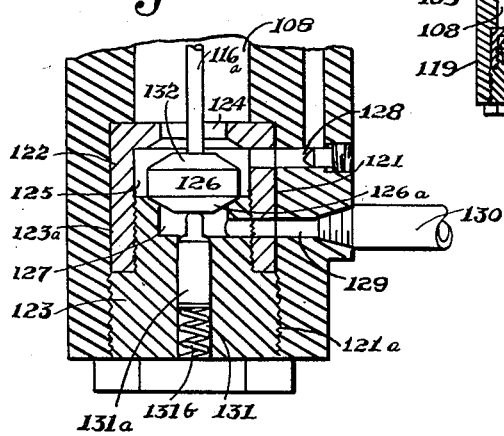
Fig. 2 is an enlarged fragmentary section through the end of the pilot mechanism, the parts corresponding to the position shown in Figure 1.

Directing attention now more specifically to Fig. 2, the pilot 22 includes a boss 119 integral with the cover 104, the cylinder 108 extending into the boss, and the boss having a counterbore 121 internally threaded as shown at 121a. Received in the counterbore 121 is a pilot valve unit comprising a sleeve 122 and a plug 123 threaded into the sleeve as shown at 123a and into the threaded portion 121a of the counterbore. The sleeve 122 has a central opening 124 for the passage therethrough of the stem 116a and for the passage of water into the pilot, and also has a chamber 125 within which is disposed a valve member 126. The valve member 126 has a lower conical face 126a adapted to seat in a corresponding conical face in the upper end of the plug 123. The upper end of the plug is provided with a recess 127 and the conical seat is disposed between this recess and the main chamber so that when the valve member 126 is forced downward by action of the stem 116a communication is closed between the main chamber and the recess 127. Communicating with the chamber 125 is a channel 128 which extends outwardly and upwardly through the boss 119 and opens into the space between the cover and the diaphragm 103. The channel 129 communicates with the recess 127 and opens into a pipe 130 communicating with drain. The plug 123 has a bore 131 receiving a pin 131a normally urged upward by action of a coiled compression spring 131b. The pin 131a bears against the bottom of the valve member 126 so that the spring 131b normally urges the valve member upwardly toward a position in which an upper conical face 132 thereon seats against a complementary conical face in the sleeve to close communication between the cylinder 108 and the channel 128.

*Operation*

In Figs. 9 through 11 the manner in which the valve is employed in combination with the other elements of a base-exchange water treatment apparatus is shown. In these figures the numeral 138 designates a water treatment tank such as a tank for base-exchange material, the top of the tank being connected to pipe connection 23 through a pipe 139, the bottom of the tank being connected to pipe connection 34 by a pipe 141 and an intermediate point in the tank just above the zeolite bed being indirectly connected to the chamber 52 through the pipe 58 and the injector. The numeral 142 indicates a reagent tank such as the customary brine tank which is connected by a pipe 143 to the pipe connection 54 (Fig. 7). A water supply pipe indicated diagrammatically by the numeral 144 is connected to the pipe connection 41, a service water pipe 145 is connected to the pipe connection 37, and a drain pipe 146 is connected to the pipe connection 29. Figs. 1, 2, and 6 through 9 show the parts of the valve in the normal service position, and in this position water enters through the pipe 144 and the channel 42, thence passing up through the port 46 into the interior of the bonnet. From the bonnet the water passes out through the port 26 into the pipe 139 leading to the top of the tank, and from the bottom of the tank passes through pipe 141 to stator port 36, thence through this port and through rotor port 79, the transfer passage 83, the rotor port 82 and the stator port 39 to the service pipe 145. In this position the rotor port 78 is disposed over the blank port 48, the drain ports 32 and 33 are closed by the face of the rotor plate, the rotor port 81 is closed by the blank port 49, and the stator port 51 is closed by the face of the rotor so that no flow occurs at these points.

In order to shift the valve to the backwash position shown in Fig. 10, the operator grasps the handle 93 and raises the outer end thereof until the guide 99 clears the slot in the housing 85. During the initial portion of this movement the stem 66 moves upwardly through a lost motion until the collar 71 strikes the lower end of the sleeve 67, and during this movement the rod 116 is raised so that the lower end thereof moves away from the valve member 126. This permits the valve member to move upwardly under the action of the spring 131b into the position shown in Fig. 4, closing the opening 124 and establishing connection between the channels 128 and 129 through the chamber 125 and recess 127 and allowing the water to drain from between the diaphragm and the cap. The pressure of the water in chamber 43 moves the diaphragm down to the position in Fig. 3 with the gasket 114 against the seat 47 closing the port 46 and holding it closed to thus shut off the water pressure from the bonnet 18. The rate of this movement is controlled by the rate at which water is allowed to pass through the channel 128, the size of which is controlled by a restriction bushing or a needle valve if desired, and consequently, regardless of the magnitude of the water pressure, the rate at which the diaphragm valve closes can be regulated to avoid water-hammer and the resultant surges of pressure in the line. Furthermore, the disk 113b is of such diameter that as it enters the seat 47 it acts to gradually and progressively interrupt the flow through the port to prevent too rapid seating of the valve during final stages of the closing operation. When the port 46 is closed, under normal conditions the pressure in the bonnet 18 drops very rapidly so that the movement of the handle can be continued to the position shown in Fig. 5, the collar 71 simultaneously lifting the rotor free of the gaskets 27. When the handle reaches the position shown in Fig. 5 it is then rotated about a vertical axis through 180° to the next slot in the housing 85, at which point the handle is returned downwardly to the position shown in Figure 1. During the initial part of this movement while the handle is moving to the position shown in Fig. 3, the rotor moves down to the position of this figure establishing the new port arrangement. Since there is no flow of pressure water through the port 46 during this mocement, the rotor will not be snapped down by the action of the pressure as in prior constructions, but will be seated gently against the gaskets 27. As the handle is then moved downwardly from the position shown in Fig. 3 back to the position of Figure 1, the stem 66 has lost motion with respect to the rotor until the collar 72 abuts against the upper end of the sleeve 67. During this movement the rod 116 is pressed against the valve member 126 of the pilot, forcing this member down against the action of spring 131b until the conical wall 126a comes against the seat. This permits water in the chamber 43 to flow through the opening 107a, the bore 118, opening 124, chamber 125 and channel 128 to the lower side of the diaphragm, equalizing the pressure on opposite sides of the diaphragm so that the pressure in chamber 43 acting on the disk 113b, opens the port 46. Here again the rate at which the water can pass through the channels is limited by the size of the channel 128 so that the diaphragm 103 opens the valve slowly and permits a gradual equalization of pressure so as to avoid the water-hammer.

In this position of the valve, incoming water entering through the port 46 passes down through rotor port 77 into stator port 36 and thence through pipe 141 to the bottom of the softener, emerging from the top of the softener and flowing through pipe 139 to stator port 26, passing through stator port 26, rotor port 79, transfer passage 83, rotor port 82 and stator port 32 to drain, thereby effecting the flow required for backwashing the water treatment tank. It will be seen that in this position of the rotor, the rotor port 81 is closed by the blank port 48, the rotor port 78 is closed by the blank port 49, and the face of the rotor acts to seal the ports 33, 39 and 51 so that there is no flow through the service line.

At the close of the backwash interval, the valve is shifted to the next succeeding position in the manner heretofore described, the rotor being turned through 135° to bring the rotor port 77 over the stator port 51. This brings the rotor port 78 over the stator port 26, the rotor port 79 in registration with stator port 33, and rotor port 81 into registration with stator port 36. The rotor port 82 is then closed by the blank stator port 49, and the stator ports 39 and 32 are closed by the face of the rotor. There is therefore no flow of water through the service port or to the service line in this position of the valve. In this position of the valve, incoming water from the bonnet 18 flows down through rotor port 77 and stator port 51 into the chamber 52, thence flowing through the injector into the pipe 58. This operation places a reduced pressure on the pipe 143 to the reagent tank 142, and when a valve 148 in the pipe 143 is open, reagent is drawn from the reagent tank into the injector and mixed with the water flowing therethrough, the combined mixture being delivered through the pipe 58 to the tank 138 at a point above the mineral bed, as heretofore described. Simultaneously water flows from the bonnet through the rotor port 78 and stator port 26 into the pipe 139 and thence to the extreme top of the water treatment tank 138. The port 78 is of such area as to produce a very small flow through the head space of the softener just sufficient to insure that the brine will be carried down through the mineral bed. The spent brine and water thus introduced into the water treatment tank passes out through the bottom thereof by way of pipe 141 to stator port 36, thence through rotor port 81 and through the transfer passage 83, the rotor port 79, the stator port 33 and the chamber 31 to the drain pipe 146.

When the required amount of regenerating solution has been introduced into the water treatment tank, the valve 148 is closed, interrupting flow of reagent to the injector, and thereafter water continues to flow through both the rotor ports 77 and 78 to the top of the water treatment tank to effectuate the rinsing thereof. When the treatment tank has been rinsed to the required degree, the multi-port valve is again shifted in the manner heretofore described back to the position shown in Figure 1 turning the rotor through 45° and bringing the rotor and stator into the relationship shown in Fig. 9 to reestablish service operation of the water treatment device.

While a specific gasket arrangement between the ports of the rotor and stator has been shown herein, it will be understood that any of the gasket arrangements commonly used and known are so arranged so as to provide a seal at the blank ports 48 and 49. For example, the gaskets 27 may be placed on the rotor at 45° intervals or other types of gasket arrangements may be used such as described in prior art patents.

It will be seen that the invention provides a single control multiple port valve in which all of the essential steps in the regeneration of a water treatment device are conducted through the operation of a single valve with the exception of the independent valve in the reagent line, in that the valve is so arranged and constructed as to provide two independent flows to the treatment tank during the introduction of the reagent, whereby the valve is adapted to control large industrial units employing low capacity minerals. The port arrangement is also such that there is no flow to the service line in either of the regeneration positions of the valve so that at no time is the service water contaminated by raw water from the source of supply. It will also be seen that the single manipulation of the valve operator also serves to terminate the flow of pressure liquid to the valve and to reestablish the flow in such manner as to avoid sudden changes in pressure and surges in the pipes producing waterhammer.

I claim:

1. The combination in a multiple port valve of a stator member having a plurality of ports, a rotor member having a plurality of ports positioned to register with the ports in said stator, a cover on said stator enclosing said rotor, said valve having a supply port for supplying liquid under pressure to said cover, means for rotating said rotor to successive positions to establish different combinations of rotor and stator ports to change the flow through the valve, an hydraulically operated valve for controlling the flow through said supply port, a pilot valve for controlling the time and rate of movement of said hydraulically operated valve, and means operated by the first-mentioned means for operating said pilot valve to close said hydraulically operated valve prior to movement of said rotor out of any of said positions and to open the same after movement of the rotor to a successive position thereof to relieve the liquid pressure on said rotor during the movement thereof.

2. The combination in a multiple port valve of a stator member having a plurality of ports, a rotor member having a plurality of ports positioned to register with the ports in said stator, a cover on said stator enclosing said rotor, said valve having a supply port for supplying liquid under pressure to said cover, means for rotating said rotor from one position to another to establish different combinations of rotor and stator ports to change the flow through the valve, said means including a movable stem centrally disposed with respect to said rotor, said stem having lost motion with respect to said rotor at the beginning and at the end of its movement, an hydraulically operated valve for controlling the flow through said supply port and a pilot valve for controlling the time and rate of movement of said hydraulically operated valve operated by the lost motion of said stem for closing said hydraulically operated valve prior to movement of the rotor and for opening said hydraulically operated valve after movement of the rotor to a succeeding position to relieve the liquid pressure on said rotor during the movement thereof.

3. The combination in a multiple port valve of a stator member having a plurality of ports, a rotor member having a plurality of ports positioned to register with the ports in said stator, a cover on said stator enclosing said rotor, said valve having a supply port for supplying liquid under pressure to said cover, a stem on said rotor movable longitudinally for moving the rotor toward and away from said stator and rotatable for rotating said rotor to establish different combinations of rotor and stator ports to change the flow through the valve, said stem having longitudinal lost motion with respect to said rotor during a part only of the stem movement, an hydraulically operated valve for controlling the flow through said supply port, and a pilot valve for controlling said hydraulically operated valve operated by said lost motion of said stem to close said hydraulically operated valve upon lost motion movement of said stem in a direction to move said rotor away from said stator and to open the valve upon lost motion movement in the opposite direction.

4. The combination in a multiple port valve of a stator member having a plurality of ports, a rotor member having a plurality of ports positioned to register with the ports in said stator, a cover on said stator enclosing said rotor, said valve having a supply port for supplying liquid under pressure to said cover, operating means for lifting, turning and reseating said rotor to establish different combinations of rotor and stator ports to change the flow through the valve, an hydraulically operated valve for controlling the flow of liquid through said supply port, and a pilot for controlling said hydraulically operated valve driven by said operating means prior to lifting movement of the rotor to a position to close said hydraulically operated valve and driven by said operating means after reseating movement of the rotor to a position to open said hydraulically operated valve to thereby terminate the flow of pressure liquid to said cover during the lifting, turning and reseating of said rotor.

5. The combination in a multiple port valve of a stator member having a central supply port and a plurality of ports arranged annularly thereof, a rotor member having a central port and a plurality of ports positioned to register with the annular ports in said stator, a cover on said stator enclosing said rotor, a stem on said rotor movable longitudinally for lifting and reseating the rotor and rotatable for rotating the same to establish different combinations of rotor and stator ports to change the flow through the valve, said stem having longitudinal lost motion with respect to said rotor, a valve member for controlling the flow through said supply port, a diaphragm for driving said valve member movable between a position for closing said port and an open position, a pilot valve attached to the side of said stator opposite said ports, and means disposed between said stem and said pilot extending through said supply port and said diaphragm for operating said pilot by the lost motion movement of said stem prior to movement of the rotor to move said diaphragm to closed position of said valve member upon initial lifting movement of said stem and move said diaphragm to open position of said valve member after reseating of the rotor at the termination of the reseating movement of said stem.

6. The combination in a multiple port valve of a stator member having a central chamber, a central port therein and a plurality of ports arranged annularly of said central port, a rotor member having a plurality of ports positioned to register with the annular ports in said stator, a cover on said stator enclosing said rotor, a stem on said rotor movable longitudinally for lifting and reseating the same and rotatable for rotating the rotor to establish different combinations of rotor and stator ports, said stem having longitudinal sliding movement with respect to said rotor, means acting between said rotor and said stem to press said rotor against said stator in the seated position of the rotor, means acting between said stem and said rotor for lifting said rotor after a preselected movement of said stem and for longitudinal movement of the stem with respect to the rotor after reseating of the latter, a valve member for said central port, a diaphragm in said central chamber for driving said valve member between a closed position across said central port and an open position in spaced relation thereto, a cap secured against the side of said stator member opposite said ports confining the periphery of said diaphragm and shaped to support said diaphragm against the pressure of the liquid in said central chamber, a pilot on said cap for admitting and relieving fluid pressure to the area between said cap and said diaphragm, and means operated by said stem upon longitudinal movement thereof with respect to said rotor in the lifting movement of the stem for operating said pilot to exhaust pressure fluid from between said cap and said diaphragm and to admit fluid pressure thereto upon longitudinal movement of said stem with respect to said rotor during reseeating movement of said stem to thereby close the central port prior to lifting of the rotor and open the port after reseating thereof.

7. The combination in a multiple port valve of a stator member having a plurality of ports, a rotor member having a plurality of ports positioned to register with the ports in said stator, a cover on said stator enclosing said rotor, said valve having a supply port for supplying liquid under pressure to said cover, means for rotating said rotor to establish different combinations of rotor and stator ports to change the flow through the valve, a hydraulically operated valve for controlling the flow through said supply port, a pilot valve for said hydraulically operated valve, said pilot valve comprising a body, a conduit connecting said body with said hydraulically operated valve, and alternately operative conduits connecting the first mentioned conduit to a source of fluid pressure and to a drain, and valve means operated by the first mentioned means in one position thereof to establish communication between the first mentioned conduit and one of said alternate conduits and simultaneously close communication between said first mentioned conduit and another of said alternate conduits to operate said hydraulically operated valve in one direction to close said supply port and operated by said first mentioned means upon movement to a second position to close communication between said first mentioned conduit and the first mentioned alternate conduit and simultaneously establish communication between said first mentioned conduit and the second mentioned alternate conduit to move said hydraulically operated valve in the opposite direction to open said supply port whereby to relieve the fluid pressure on said rotor during the rotation thereof.

8. In a plate type valve, the combination of a ported body member, a ported stem plate adapted to effect different communication between the ports in the body member in different positions of the plate, a cover on the body member enclosing the plate, said body member having a pressure port normally communicating with the inside of the cover member, means for turning the plate to different operative positions, valve means reciprocable relative to the last means and stem plate independently of any rotary movement of the stem plate for closing the pressure port prior to rotary movement of said plate from one position to another, pressure fluid operable means and valve means connected with a source of pressure fluid supply and with a pressure fluid drain for alternately controlling the release of pressure from the pressure fluid operable means to the drain and communication of said pressure fluid operable means with the source of pressure fluid supply, said reciprocable valve means being connected with the fluid pressure operable means to give the reciprocable valve means reciprocatory movement upon admission of pressure fluid to said pressure fluid operable means.

9. In a multiport valve comprising a ported body, and a ported plate adapted to effect different communication between the ports in the body in different positions of the plate, a cover for said body, an index plate thereon having circumferentially spaced notches therein, a stem for turning said ported plate projecting from the cover, a manually operable member for turning the ported plate carried on the stem and lockable in any selected notch, an auxiliary control valve arranged to control the flow through a port of said valve, reciprocable relative to the stem and operatively associated with said manually operable member and arranged to be moved thereby independently of any rotation of the ported plate, and spring means associated with said manually operable member and control valve for normally holding said member locked in a notch and holding said control valve normally in a predetermined position.

10. A valve as set forth in claim 9, including a shut-off valve for closing a pressure port provided in a portion of the multiport valve, means for closing said shut-off valve preliminary to the plate being turned, and pressure fluid operable means for operating said last-named means, said auxiliary control valve alternately controlling the release of pressure from the pressure fluid operable means to the drain and communication of said pressure fluid operable means with the source of pressure fluid supply.

11. The combination in a multiple port valve of a stator member having a plurality of ports, a rotor member having a plurality of ports positioned to register with the ports in the stator, a cover on said stator enclosing said rotor, said stator having a supply port for supplying liquid under pressure to said cover, means connected to said rotor member for rotation thereof and having a connection permitting limited reciprocatory motion relative to said rotor member, a hydraulic valve cooperating with said supply port to control flow therethrough and having fluid pressure responsive means operable by said liquid pressure and connected to said hydraulic valve for operation thereof, a pilot valve having fluid pressure supply and exhaust passages communicating with said fluid pressure responsive means, said passages being controllable by operation of said pilot valve and being restricted to control the rate of movement of said hydraulic valve, and means operatively connecting said pilot valve to said first-mentioned means for reciprocation thereby, whereby said pilot valve causes operation of said hydraulic valve to stop flow from said supply port to said cover prior to movement of said rotor member by said first-mentioned means.

12. In a multiport valve comprising a ported body, and a ported plate adapted to effect different communication between the ports in the body in different positions of the plate, a cover element for said body, a stem element for turning said ported plate projecting through said cover, an index member on one of the aforesaid elements having circumferentially spaced notches therein, operating means cooperable with said index member and carried on the other of said elements for turning the stem and ported stem plate, the operating means being separately lockable in each of said notches, an auxiliary control valve arranged to control the flow through a port of said valve, the control valve being reciprocable relative to the stem and operatively associated with said operating means and arranged to be moved thereby independently of any rotation of the ported plate, and means associated with said operating means and control valve for normally holding the operating means in a notch and holding the control valve normally in a predetermined position.

OSCAR W. JOHNSON.

REFERENCES CITED

The following references are of record in the file of this patent:

UNITED STATES PATENTS

| Number | Name | Date |
|---|---|---|
| 798,551 | Willits | Aug. 29, 1905 |
| 854,138 | Backus | May 21, 1907 |
| 1,255,359 | Uecke | Feb. 5, 1918 |
| 1,490,106 | Haas | Apr. 15, 1924 |
| 1,831,656 | Eisenhauer | Nov. 10, 1931 |
| 1,950,728 | Heaney | Mar. 13, 1934 |
| 2,047,131 | Riche | July 7, 1936 |
| 2,092,716 | Hungerford et al. | Sept. 7, 1937 |
| 2,093,692 | Daniels | Sept. 21, 1937 |
| 2,111,169 | Clark | Mar. 15, 1938 |
| 2,153,559 | Hendricks | Apr. 11, 1939 |
| 2,235,287 | Daniels | Mar. 18, 1941 |
| 2,235,304 | Toussaint | Mar. 18, 1941 |
| 2,243,815 | Griswold | May 27, 1941 |
| 2,298,356 | Eickmeyer et al. | Oct. 13, 1942 |
| 2,398,437 | McGill et al. | Apr. 16, 1946 |

FOREIGN PATENTS

| Number | Country | Date |
|---|---|---|
| 19,625 | Great Britain | of 1908 |